United States Patent [19]

Schimmelschmidt et al.

[11] 3,725,515
[45] Apr. 3, 1973

[54] PROCESS FOR THE PREPARATION OF DIALKYL PHOSPHITES FROM ALCOHOLS AND PHOSPHOROUS ACID

[75] Inventors: Kurt Schimmelschmidt, Bad Homburg; Hans-Jerg Kleiner, Bad Soden, Taunus, both of Germany

[73] Assignee: Farbwerke Hoeschst Aktiengesellschaft Vormals Meister Lucius & Bruning, Frankfurt/Main, Germany

[22] Filed: Mar. 4, 1970

[21] Appl. No.: 16,609

[52] U.S. Cl.....................260/978, 260/963, 260/967
[51] Int. Cl................................................C07f 9/08
[58] Field of Search..............................260/978, 967

[56] References Cited

UNITED STATES PATENTS 2,670,368   2/1954   Baker et al........................260/978

Primary Examiner—Lewis Gotts
Assistant Examiner—Anton H. Sutto
Attorney—Curtis, Morris & Safford

[57] ABSTRACT

Improved process for the preparation of dialkyl phosphites by means of refluxing phosphorous acid with alcohols under azeotropic separation of the reaction water formed, wherein primary or secondary straight-chained or branched aliphatic alcohols having at least 4 carbon atoms are reacted in an excess of at least 45 percent over the stoichiometrical amount with phosphorous acid in the absence of an inert solvent until the amount of acid in the reaction mixture is as low as possible. In comparison to known processes the dialkyl phosphites are obtained according to the instant process in higher yields and with higher purity. The dialkyl phosphites are valuable intermediates. Owing to their high purity, they are especially suitable as starting materials for such reactions catalyzed by radicals.

7 Claims, No Drawings

PROCESS FOR THE PREPARATION OF DIALKYL PHOSPHITES FROM ALCOHOLS AND PHOSPHOROUS ACID

The present invention relates to a new process for the preparation of dialkyl phosphites from alcohols and phosphorous acid.

According to the process disclosed in U.S. Pat. No. 2.670.368, dialkyl phosphites can be prepared from phosphorous acid and alcohols in the presence of an inert organic solvent which serves for an azeotropic removal of the reaction water together with excess alcohol. This process requires considerable reaction times, the reaction products obtained by distillation in a yield of from 50 to 65 percent contain Bl. and the absence of an inert solvent in this process leads to even more unfavorable results (c.f. G.M. Kosolapoff, Organphosphorus Compounds, New York 1950, 189 and Houben-Weyl "Methoden der Organischen Chemie", 12/2, 20). Heating of mixtures of alcohols and phosphorous acid may lead, in the case of a dehydration of the alcohols, to ethers, olefins and oligomers of the corresponding olefins, or in the case of a dehydration of phosphorous acid, to pyrophosphorous acid which is formed from phosphorous acid already at 80°C in vacuo (c.f. F. Hossenlopp et al., bl. Soc. Chim. 1960, 791). Furthermore, disproportionation of phosphorous acid into phosphoric acid and phosphine at a temperature exceeding 150°C is known (cf. L. Hackspill et al., Chim. Ind. 27 (1932) 453/7 S). It is also known that dialkyl phosphites decompose easily at high temperatures to yield phosphorous acid and olefins in the presence of acids, for example non esterified phosphorous acid or phosphoric acid formed by disproportionation. The phosphorous acid necessarily formed by this decomposition reaction may then lead to a complete decomposition of the dialkyl phosphites.

It has now been found that dialkyl phosphites are obtained in very good yield and with high purity upon refluxing phosphorous acid and alcohols with azeotropic separation of the reaction water formed, by reacting primary or secondary linear or branched aliphatic alcohols having at least four carbon atoms in an excess of at least 45 percent over the stoichiometrical amount with phosphorous acid in the absence of an inert solvent until the amount of acid in the reaction mixture has reached its lowest value.

It is surprising that, under these conditions, by-products, such as olefins, oligomers thereof or ethers, are not formed or are formed to a slight extent only.

To shorten the reaction time it is suitable to start from crystallized phosphorous acid which can, however, also be used in a concentrated aqueous solution having a water content of up to about 20 percent.

As alcohols there are used primary or secondary linear or branched aliphatic alcohols containing from four to 16 carbon atoms, preferably from four to eight carbon atoms, for example n-butanol, i-butanol, n-pentanol-(1), 3-methylbutanol-(1), n-hexanol-(1), 2-ethylbutanol-(1), 4-methylpentanol-(2), n-heptanol-(1), 2-ethylhexanol-(1), n-dodecanol-(1) and n-hexadecanol-(1) as well as mixtures of these alcohols.

When secondary alcohols are used, the information of by-products may be slightly increased and the yield of the corresponding dialkyl phosphites may be slightly reduced.

Alcohol is used, as it has already been mentioned, in an excess of at least 45 percent over the stoichiometrical amount. The upper limit for the alcohol excess is practically only determined by economic reasons. Thus, it is possible to operate with an excess of 500 percent and more, but an excess of from about 70 to 200 percent is preferably used.

According to the process of the invention, the whole amount of alcohol can be refluxed with phosphorous acid, but it is also possible to heat part of the total alcohol amount at the boil whereas a mixture of phosphorous acid and the rest of alcohol are added subsequently. The reaction water formed is removed in an azeotropic mixture with alcohol, for example by means of a water separator, whereas the alcohol is continuously recycled to the process. The separated reaction water contains the alcohol used in such an amount as it is soluble in water.

The reaction is discontinued when the amount of acid in the reaction mixture has attained its lowest value which can easily be determined, for example by titration of continuously taken samples. When the reaction is continued beyond this moment, the acid number of the reaction mixture may rise again, the yield of the desired dialkyl phosphites may be reduced and the amount of by-products may considerably by increased to such an extent that they become finally the main products of the reaction. The reaction time necessary for attaining the lowest acid value and thus a high yield depends on the boiling point of the alcohol used and hence also on its chain length. The higher the boiling point of the alcohol used the shorter generally its optimum reaction time.

It may also be advantageous, especially when alcohols of an elevated boiling point are used, to carry out the reaction under reduced pressure and/or under an atmosphere of an inert gas, preferably pure nitrogen. This further reduces, or entirely prevents, the formation of by-products, such as ethers or phosphoric acid, by atmospheric oxygen.

Since the reaction is carried out under reflux, the reaction temperature is determined by the boiling point of the azeotropic mixture consisting of the alcohol used and the reaction water, under the pressure applied for each case. Generally, the reaction temperatures are in the range of from about 100° to 250°C, preferably from about 140° to 200°C.

The by-products obtained, if any, are small amounts of olefins and ethers as well as oligomers of the olefins, sometimes alkyl phosphonic acid esters, alkyl phosphonic acids, pyrophosphorous acid and phosphoric acid.

When the reaction is complete, the reaction mixture is distilled under reduced pressure. In addition to volatile byproducts, if any, first unaltered alcohols in excess are obtained which can be used again. The dialkyl phosphites obtained are worked up in usual manner. As far as the products are easy to distil, they are purified, preferably, by distillation under reduced pressure using a distillation column. Dialkyl phosphites obtained from higher alcohols may be purified by molecular distillation or according to conventional extraction methods. The process of the present invention provides dialkyl phosphites in good to very good yields and with a high purity.

The dialkyl phosphites obtained in pure form according to the invention are valuable intermediates to be used for the production of numerous organophosphorus products. Owing to their purity, they are especially suitable as starting materials for those reactions catalysed by radicals, such as disclosed, for example, in Belgian Pat. No. 711,999.

The following examples serve to illustrate the invention.

EXAMPLE 1

0.8 kg of 2-ethylhexanol-(1) was refluxed while stirring. A mixture of 0.5 kg of phosphorous acid and 1.5 kg of 2-ethyl-hexanol-(1) (in a total excess of 45.0 percent) was added dropwise thereto within 4 hours. The reaction temperature rose from 185°C to 208°C. 250 ml of water were separated by means of a water separator. 1 g of the cooled reaction mixture consumed 0.9 ml or 0.1 N sodium hydroxide solution. After the subsequent distillation 93 g of octene (corresponding to a conversion rate of 2-ethylhexanol used of only 5 percent), unaltered excess 2-ethylhexanol, 150 g of di-(2-ethylhexyl) ether (corresponding to a conversion rate of 2-ethylhexanol used of only 7.5 percent) and 1.68 kg of di-(2-ethyl-hexyl)-phosphite, boiling point 130°–135°C, under a pressure of 0.1 mm mercury, were obtained in a yield of 90 percent of the theory. The distillation residue was 200 g.

EXAMPLE 2

0.5 kg of phosphorous acid and 2.8 kg of 2-ethylhexanol-(1) (in an excess of 77 percent) were refluxed while stirring and under pure nitrogen for 4 hours, the reaction temperature rising from 140° to 212°C. 240 ml of water were separated by means of a water separator. 1 g of the cooled reaction mixture consumed 0.7 ml of 0.1 N sodium hydroxide solution. After the subsequent distillation, the excess 2-ethylhexanol, 90 g of di-(2-ethylhexyl) ether (corresponding to a conversion rate of 2-ethylhexanol used of only 3.5 percent) and 1.74 kg of di-(2-ethylhexyl)-phosphite, corresponding to 93 percent of the theoretical yield, were obtained. The distillation residue was 120 g. Practically no olefins were formed.

When the same reaction was not carried out under normal pressure but under reduced pressure (190–200 mm mercury), while stirring and under reflux, the reaction temperature rose from 124°C to 158°C in the course of 6 hours when 0.5 kg of phosphorous acid and 3.75 kg of 2-ethylhexanol-(1) (in an excess of 137 percent) were used. By means of a water separator 218 ml of water were separated. 1 g of the cooled reaction mixture consumed 0.7 ml of 0.1 N sodium hydroxide solution. After the subsequent distillation, excess 2-ethylhexanol, only 15 g of di-(2-ethylhexyl) ether (corresponding to a conversion rate of 2-ethylhexanol used of only 0.95 percent) and 1.68 kg of di-(2-ethyl-hexyl) phosphite (90 percent of the theory) were obtained. The distillation residue amounted to 200 g. No olefins were formed.

EXAMPLE 3

0.3 kg of phosphorous acid and 1.5 kg of n-pentanol-(1) (in an excess of 133 percent) were refluxed while stirring, the temperature of the reaction mixture rising from 140° to 161°C. After 15 hours 149 ml of water containing pentanol were separated by means of a water separator. 1 g of the cooled reaction mixture consumed 4.5 ml of 0.1 N sodium hydroxide solution. The mixture was subjected to distillation. In addition to excess unaltered n-pentanol-(1), 695 g of di-(n-pentyl)-phosphite, boiling point 88°C, under a pressure of 0.25 mm mercury, (86 percent of the theory) were obtained. The distillation residue amounted to 60 g. No ethers nor olefins were formed.

EXAMPLE 4

0.3 kg of phosphorous acid and 1.4 kg of isoamyl alcohol (in an excess of 117 percent) were refluxed while stirring for 18 hours, the reaction temperature rising from 130° to 146°C. 138 ml of water containing isoamyl alcohol were separated by means of a separator. 1 g of the cooled reaction mixture consumed 5.5 ml of 0.1 N sodium hydroxide solution. After the subsequent distillation, there were obtained, in addition to excess unaltered isoamyl alcohol, 645 g of di-(3-methylbutyl) phosphite, boiling point 80°C, under a pressure of 0.2 mm mercury, (79 percent of the theory). The distillation residue amounted to 75 g. No ethers nor olefins were formed.

EXAMPLE 5

0.3 kg of phosphorous acid and 1.4 kg of a mixture of amyl alcohol (57 percent of n-pentanol-(1), 43 percent of a mixture of 2-methyl-butanol-(1) and 3-methyl-butanol-(1)) (in an excess of 117 percent) were refluxed while stirring for 16 hours. The reaction temperature rose from 130° to 152°C. 144 ml of water containing amyl alcohol were separated by means of a separator, 1 g of the cooled reaction mixture consumed 6.3 ml of 0.1 N sodium hydroxide solution. After the subsequent distillation excess unaltered alcohols and 650 g of dipentyl phosphites, boiling point 88°–92°C, under a pressure of 0.5 mm mercury, were obtained which corresponded to a theoretical yield of 80 percent. The distillation residue amounted to 90 g. No ethers nor olefins were formed.

EXAMPLE 6

0.25 kg of phosphorous acid and 1.6 kg of n-hexanol-(1) (in an excess of 156 percent) were refluxed while stirring for 5 hours, the reaction temperature rising from 142° to 172°C. A total amount of 117 ml of water containing hexanol was separated by means of a separator. 1 g of the cooled reaction mixture consumed 2.5 ml of 0.1 N sodium hydroxide solution. After the subsequent distillation, there were obtained, in addition to excess unaltered n-hexanol-(1), 122 g of di-(n-hexyl) ether (corresponding to a conversion rate of hexanol used into ether of only 8.4 percent) and 655 g of di-(n-hexyl) phosphite, boiling point 102° – 106°C, under a pressure of 0.15 mm mercury, (86 percent of the theory). The distillation residue amounted to 44 g. No olefins were formed.

EXAMPLE 7

0.3 kg of phosphorous acid and 2 kg of 4-methylpentanol-(2) (in an excess of 167 percent) were refluxed while stirring for 11 hours, the reaction temperature rising from 130° to 142 °C. By means of a separator 132 ml of water containing methyl-pentanol were separated, 1 g of the cooled reaction mixture consumed 6.3 ml of 0.1 N sodium hydroxide solution. After the subsequent distillation 69 g of a mixture of several hexenes (corresponding to a conversion rate of methylpentanol used of only 4.5 percent), excess unaltered alcohol and 621 g of di-(4-methylpentyl-(2)-phosphite, boiling point 83°–85°C, under a pressure of 0.3 mm mercury, were obtained (68 percent of the theory). The distillation residue amounted to 135 g. No ethers were formed.

EXAMPLE 8

0.24 kg of phosphorous acid and 1.473 kg of 2-ethyl-butanol-(1) (in an excess of 149 percent) were refluxed while stirring for 5½ hours. The reaction temperature rose from 138° to 159°C. By means of a separator 106 ml of water containing ethylbutanol were separated. 1 g of the cooled reaction mixture consumed 1.0 ml of 0.1 N sodium hydroxide solution. After the subsequent distillation excess unaltered ethylbutanol and 711 g of di-(2-ethylbutyl) phosphite, boiling point 94°–96C, under a pressure of 0.1 mm mercury, were obtained, corresponding to a theoretical yield of 97.5 percent. The distillation residue amounted to 37 g. No olefins and practically no ethers were formed.

EXAMPLE 9

0.24 kg of phosphorous acid and 1.54 kg of n-heptanol-(1) (in an excess of 122 percent) were refluxed while stirring for 1 hour, the reaction temperature rising from 142° to 197° C. By means of a separator 118 ml of water were separated. 1 g of the cooled reaction mixture consumed 2.3 ml of 0.1 N sodium hydroxide solution. After the subsequent distillation excess unaltered n-heptanol-(1), 90 g of di-(n-hepthyl) ether (corresponding to a conversion rate of heptanol used of only 6.3 percent), and 660 g of di-(n-heptyl)-phosphite, boiling point 125°–130°C, under a pressure of 0.3 mm mercury, were obtained (81 percent of theoretical yield). The distillation residue amounted to 85 g. No olefins were formed.

Comparative example

The process disclosed in Example 9 was repeated but the reaction period of 1 hour was extended to 7 hours. After the lowest acid value mentioned in Example 9 had been attained, the amount of acid increased continuously in the reaction mixture. The temperature rose from 142° to 248°C, then fell again to 219°C. By means of a water separator 166 ml of water were separated. 1 g of the cooled reaction mixture consumed 9.7 ml of 0.1 N sodium hydroxide solution after 7 hours. After the subsequent distillation 42 g of heptene-(1) (corresponding to a conversion rate of heptanol used of 2.8 percent), 795 g of di-(n-heptyl) ether (corresponding to a conversion rate of heptanol used of 56 percent) and 236 g of di-(n-heptyl) phosphite, corresponding to a theoretical yield of only 29 percent, were obtained. Another distillation was impossible owing to considerable decomposition phenomena. The distillation residue amounted to 380 g, whereas 35 g of heptene-(1) had formed again at the end of the distillation in the cooling trap connected with the distillation apparatus.

EXAMPLE 10

0.15 kg of phosphorous acid and 1.7 kg of dodecanol (in an excess of 150 percent) were cautiously refluxed while stirring for 2 hours under a pressure of 60 mm mercury, the temperature of the cooling water being 40°C. By means of a water separator and a cooling trap connected to the apparatus 68 ml of water were collected. The temperature of the reaction mixture rose from 155° to 195°C. 1 g of the cooled reaction mixture consumed 0.2 ml of 0.1 N sodium hydroxide solution when the reaction was complete. Subsequently, the main part of excess dodecanol was distilled off under a pressure of 0.1 mm mercury up to an internal temperature of 190°C and passed over at a temperature of 115°C. The residue was 855 g, which solidified at 10°C and was recrystallized from petrol ether. A total amount of 710 g of didodecyl phosphite, m.p. 31.5°C, boiling point 188°–192°C, under a pressure of 0.6 mm mercury, was obtained (92.5 percent of the theory). After the petrol ether had been evaporated from the filtrate, 140 g were obtained which contained only a small amount of didodecyl ether, in addition to dodecanol and didodecyl phosphite, according to the infrared spectrum. No olefins were formed.

EXAMPLE 11

0.158 kg of phosphorous acid and 2.4 kg of tetradecanol (in an excess of 190 percent) were cautiously refluxed while stirring under a pressure of 35 mm mercury for 45 minutes, the temperature of the cooling water being 70°C. The temperature of the reaction mixture rose from 130° to 202°C. In a cooling trap connected to the apparatus 72 ml of water and a small amount of tetradecanol were obtained. 1 g of the cooled reaction mixture consumed 0.2 ml of 0.1 N sodium hydroxide solution when the reaction was complete. Subsequently, the main part of excess tetradecanol was distilled off under a pressure of 0.3 mm mercury until an internal temperature of 230°C and a distillation temperature of 130°C had been achieved. The residue solidified. It was 962 g. By recrystallization from petrol ether 845 g of ditetradecyl phosphite, m.p. 42°–44°C, were obtained (92.5 percent of the theory). After evaporation of the petrol ether from the filtrate 155 g were obtained which, according to the infrared spectrum, contained ditetradecyl ether, in addition to tetradecanol and ditetradecyl phosphite. No olefins were formed.

In an analogous manner dihexadecyl phosphite, m.p. 50°–52c, was obtained in a yield of 85 percent when hexadecanol was used.

We claim:

1. In a process for the preparation of a dialkyl phosphite by heating phosphorous acid with alcohol under reflux while removing the water formed by the reaction by azeotropic distillation and controlling the rate of esterification by determination of the acid number the improvement consisting essentially of reacting a primary or secondary straight-chained or branched aliphatic alcohol containing four to 16 carbon atoms with phosphorous acid wherein said alcohol is in an amount in excess of 70 to 500 percent over the stoichiometrical amount in respect to the phosphorous acid and wherein said reacting is in the absence of an inert solvent and the reacting is carried out until the amount of acid in the reaction mixture has reached its lowest value.

2. The process as claimed in claim 1, wherein an alcohol with four to eight carbon atoms is used.

3. The process as claimed in claim 1, wherein the alcohol is used in an excess of 70 to 200 percent over the stoichiometrical amount.

4. The process as claimed in claim 1, wherein the reaction is carried out at a temperature between 100° and 250°C.

5. The process as claimed in claim 1, wherein the reaction is carried out at a temperature between 140° and 200°C.

6. The process as claimed in claim 1, wherein the reaction is carried out under reduced pressure.

7. The process as claimed in claim 1, wherein the reaction is carried out under an atmosphere of an inert gas.

* * * * *